United States Patent [19]

Schneider et al.

[11] 3,923,925
[45] Dec. 2, 1975

[54] PROCESS FOR THE PREPARATION OF POLYAMIDES WITH INCREASE IMPACT STRENGTH

[75] Inventors: Kurt Schneider; Friedrich Fahnler; Rolf Dhein, all of Krefeld; Frieder Heydenreich, Lintorf, all of Germany

[73] Assignee: Bayer Aktiengesellschaft, Leverkusen-Bayerwerk, Germany

[22] Filed: Dec. 13, 1974

[21] Appl. No.: 532,695

Related U.S. Application Data

[63] Continuation of Ser. No. 369,505, June 13, 1973, abandoned.

[30] Foreign Application Priority Data

Oct. 4, 1975   Germany............................ 2248664

[52] U.S. Cl. ........ 260/857 PG; 260/78 L; 260/78 P; 260/77.5 AM
[51] Int. Cl.² ......................................... C08G 69/18
[58] Field of Search .......... 260/78 L, 78 P, 857 PG, 260/77.5 AM; 369/505

[56]  References Cited
UNITED STATES PATENTS 3,704,280   11/1972   Van der Loos et al. .......... 260/78 L

*Primary Examiner*—Lucille M. Phynes
*Attorney, Agent, or Firm*—Plumley & Tyner

[57]  ABSTRACT

A process for the production of polyamides with improved impact strength wherein the activated anionic polymerisation is carried out in the presence of a high molecular weight polyalkylene glycol.

1 Claim, No Drawings

PROCESS FOR THE PREPARATION OF POLYAMIDES WITH INCREASE IMPACT STRENGTH

This is a continuation of Ser. No. 369,505, filed Oct. 4, 1972, now abandoned.

This invention relates to a process for the preparation of polyamides with increased impact strength, by the activated anionic polymerisation of lactams which contain at least 5 ring members in the presence of high molecular weight polyalkylene glycols.

Attempts have been made for a long time to increase the impact strength of polyamides in the dry state, in particular that of 6-polyamides and especially the impact strength at low temperatures. In the case of hydrolytically condensed 6-poly-amides, this is achieved, among other methods, by using plasticisers based on sulphonamide or by retaining the high monomer content in the polymer produced. Neither of these methods can be used in connection with the activated anionic polymerisation of lactams, the first method being excluded because of the incompatibility of the reactive lactam melt with the usual sulphonamide plasticisers (impairment of reactivity) and the second because at low polymerisation temperatures a rather complete conversion of the monomer occurs.

According to British Pat. No. 1,099,265, improvement of impact strength is achieved by adding urethane group-containing reaction products of polyalkylene glycols with an excess of polyisocyanates. This addition, however, causes an increase in the polymerization time compared with that required for unmodified products. Another disadvantage is that these products must generally be prepared in an additional process step. Moreover, the improvement in impact strength achieved by this process is insufficient for present day requirements of polyamide mouldings.

According to British Pat. No. 1,067,153 the mentioned polyethers with isocyanate end groups as well as polyethers with lactam end groups are also used for producing block copolymers consisting of polyethers and polyamides by polymerising the lactams in the presence of the said modified polyethers.

According to German Offenlegungsschriften No. 2,014,505 and 2,147,365, increased impact strength of polycaprolactam is achieved by polymerising in the presence of low molecular weight polyethers. However, in order to achieve a sufficient increase in impact strength by this process, it is necessary to add up to 25 % by weight of polyethers, which causes a considerably increase in the polymerisation time. Moreover, high-molecular weight polyethers, namely those with molecular weights above 20,000 are useless according to the teaching of these publications, because they are insoluble in the monomer melt.

It has now surprisingly been found that high molecular weight polyalkylene glycols, especially those with molecular weights of 20,000 to 35,000, are also eminently suitable for improving the impact strength of polyamides. The addition of even small quantities of these polyalkylene glycols, such as 0.2 to 0.5 % by weight, is sufficient to bring about a marked increase in the impact strength. No reduction in the polymerisation velocity is observed even if the concentration of polyether is increased to 10 % by weight. The impact strength can be increased to three times that of unmodified polyamides. The effect on other mechanical properties such as the flexural strength and the elastic modulus is slight.

Therefore an object of the subject invention is a process for the production of polyamides with improved impact strength by activated anionic polymerisation of a mixture comprising at least one lactam having at lease 5 ring members, an activator and an alkaline catalyst, wherein said mixture is polymerised after the addition of high molecular weight polyalkylene glycols having unmodified end groups.

Suitable polyethers are those with molecular weights of 18,000 to 100,000 and an OH-number below 6, preferably those with molecular weights between 20,000 and 35,000, e.g., linear and branched polyalkylene glycols, such as polyethylene glycols, polypropylene glycols, polytetrahydrofurans, polyepichlorohydrins and copolymers of ethylene glycol and propylene glycol. The polyethers are added in concentrations of 0.2 – 15 % by weight, based on the reactive lactam melt, and preferalby 0.4 – 3 % by weight.

The activators used may be any of the activators known as suitable for activated anionic polymerisation, e.g. N-acyl-lactams such as N-acetyl-caprolactam, substituted triazines, carbodiimides, cyanamides, mono- and polyisocyanates and the corresponding masked isocyanate compounds. The activators are preferably used in concentrations from 0.1 to 1 mol %, based on the quantity of lactam.

The catalysts used for the lactam polymerisation may be any alkaline catalysts commonly used for anionic polymerisations, e.g. alkali metal and alkaline earth metal compounds of lactams such as sodium-$\epsilon$-caprolactamate or alkali metals and alkaline earth metal compounds of short chain aliphatic carboxylic acids, such as sodium formate or potassium formate, or of alcohols with up to 6 carbon atoms, such as sodium methylate, or potassium tert.-butylate. Hydrides, hydroxides, or carbonates of alkali metals and alkaline earth metals may also be used. They are added in concentrations of from 0.1 to 1 mol %, based on the quantity of lactam.

The impact strength of lactams containing at least 5 ring members, e.g., $\alpha$-pyrrolidone, caprolactam, lauric lactam, caprylolactam or enantholactam and of the corresponding C-substituted lactams or mixtures of the said lactams can be increased by the process according to the invention.

The polymerisation may be carried out at a temperature of between 90° and 200°C, preferably at a temperature of between 120° and 200°C, either continuously or intermittently. The polymerisation according to the invention and simultaneous moulding is carried out by any of the known methods such as pressure-free casting. centrifugal casting, rotational moulding (U.S. Pat. Nos. 3,275,733 and 3,417,973), extrusion or injection moulding.

If the so-called two-pot method is employed, the poly-ethers may be added to the lactam melt which contains the catalyst or activator. If the so-called one-pot process is employed, the sequence in which the polymerisation components and additives are added is immaterial.

Additives may also be added to the polymerisable mixture either before, during or after polymerisation. These additives may be, for example, regulators such as butyl acetamide, inorganic or organic pigments or dyes such as carbon black, $TiO_2$ or phthalocyanines, plasticisers or mould parting agents, inorganic fibres such as glass fibres or mats or fibre asbestos, or fillers such as glass spheres, calcium carbonate or bentonite, auxiliary agents for flameproofing such as red phosphorus, organic halogen compounds, phosphoric acid esters or metal oxides, and blowing agents such as azides or hydrocarbons.

Table 1

| Polyalkylene glycol (molecular weight) | % by weight | Impact work [mkp] | Breaking quota | Impact work [mkp] | Breaking quota |
|---|---|---|---|---|---|
| — | — | 12.5 | 70 | 25 | 100 |
| Polyethylene glycol (20,000) | 0.5 | 12.5 | 25 | 25 | 80 |
| Polyethylene glycol (20,000) | 1 | 12.5 | 15 | 25 | 70 |
| Polyethylene glycol (20,000) | 2 | 12.5 | 0 | 25 | 50 |
| Polyethylene glycol (25,000) | 2 | 12.5 | 0 | 25 | 20 |
| Polyethylene glycol (31,000) | 2 | 12.5 | 0 | 25 | 30 |
| Polyethylene glycol (20,000) | 3 | 12.5 | 0 | 25 | 50 |
| Polyethylene glycol (20,000) | 5 | 12.5 | 10 | 25 | 70 |

EXAMPLE 1

98 parts of caprolactam minus the quantity of polyethylene glycol indicated in table 1 in each case are divided up and introduced into two containers. Polyethylene glycol and 1.6 parts of a solid 18 % solution of sodium caprolactamate in caprolactam are added to one half of the caprolactam and 0.4 parts of hexamethylene-1,6-diisocyanate to the other half and the mixtures are melted at 120°C under a nitrogen atmosphere. The two melts are combined in the ratio of 1 : 1 in a mixing head by means of dosing pumps and delivered at 180°C into a rotational mould measuring 300 × 200 × 180 mm. The supply is cut off after introduction of 1600 g of reactive lactam melt. A hollow polyamide article with a wall thickness of 4 mm is produced by biaxial rotation of the mould, rotation being at the rate of 25 per minute about the primary axis and 10 per minute about the secondary axis. Polymerisation is completed after 3 minutes and the hollow article is removed after a cooling time of 1 minute in air.

After 24 hours storage of the hollow polyamide articles in a standard atmosphere, i.e. 23°C at 50 % relative humidity, the articles are subjected to a falling test. The percentage of containers which break in the test is indicated in table 1 under the heading of "Breaking quota".

Surprisingly the polyamide articles thus obtained show beside their increased impact strength at low temperature also a smooth surface without any sight of bubbles.

EXAMPLE 2

Hollow polyamide articles containing various proportions of polyalkylene glycol (see table 2) are produced as described in example 1 and stored for 24 hours in a standard atmosphere at 23°C and 50% relative humidity. Test samples in the form of standard rods measuring 4 mm in thickness, 50 mm in length and 6 mm in width are cut out of these hollow articles and used for determining the impact strength in the cold in accordance with DIN 53453. The rods are cooled to −15°C for 16 hours before this impact strength test. In addition, some of the samples are used for determining the flexural stress at a given deflection according to DIN 53452 and elastic modulus according to DIN 53457 at room temperature.

Table 2

| Polyalkylene glycol (molecular weight) | % by weight | Relative viscosity in m-cresol at 25°C. | Extract content | Water content | Impact strength (mkp/cm$^2$) | Flexural stress at given deflection kp/cm$^2$ | Elastic modulus kp/cm$^2$ |
|---|---|---|---|---|---|---|---|
| — | — | 8.4$^{x)}$ | 3.7 | 0.33 | 30–35 | 1260 | 32600 |
| Polyethylene glycol (20,000) | 0.2 | 9.1$^{x)}$ | 2.2 | — | 50–55 | — | — |
| Polyethylene glycol (20,000) | 0.4 | 18.7 | 2.7 | — | 60 | — | — |
| Polyethylene glycol (20,000) | 0.6 | 9.1$^{x)}$ | 3.0 | 0.35 | 60 | 1230 | 31300 |
| Polyethylene glycol (20,000) | 1 | 17.3 | 3.8 | 0.35 | 70–75 | 1140 | 26600 |
| Polyethylene glycol (20,000) | 2 | 16.3 | 3.5 | — | 75–80 | — | — |
| Polyethylene glycol (20,000) | 3 | 12.0 | 3.9 | 0.35 | 80–90 | 1060 | 24900 |
| Polyethylene glycol (20,000) | 5 | 14.9 | 3.6 | 0.43 | 70–95 | 1040 | 24600 |
| Comparison tests | | | | | | | |
| Polyethylene glycol (1,550) | 0.2 | 18.4 | 3.3 | — | 30 | — | — |
| Polyethylene glycol (1,550) | 1 | — | — | — | 30–35 | — | — |

On increasing the concentration of polyethylene glycols which have a molecular weight of 1,550 or less, the polymerisation times obtained are too long $^{x)}$The viscosity was determined at 120°C because samples at room temperature are no longer soluble in m-cresol.

EXAMPLE 3

Parallel with the rotational moulding tests, polymerisation tests were carried out to determine the influence of polyalkylene glycols on the polymerisation velocity, molecular weight and conversion. For this purpose, the relative solution viscosity and the extract content of the polyamide were determined. Determination of the molecular weight and of the extract content were carried out in known manner by determining the relative solution viscosity in m-cresol and by extracting polymer chips in methanol for 7 hours in a Soxleth extractor. The reactivity is determined by measuring the viscosity increase during polymerisation as a function of time. Viscosity determination is carried out in a Haake Viskotester VTL 180 rotational viscosimeter at 180°C, the time up to the onset of a measurable increase in viscosity and the time required for reaching a viscosity of 16,000 cP being recorded. In detail, the tests are carried out as follows: 300 g of caprolactam are divided up into two containers in proportions by weight of 1:1. One half of the caprolactam is mixed with 6.3 g of sodium lactamate in the form of an 18% solid solution in caprolatam and the quantities of polyalkylene glycol indicated in table 3 and the second half is mixed with 1.5 g of hexamethylene-1,6-diisocyanate. The two mixtures are melted at 110°C and brought together in a Viskotester at 180°C and the progress of polymerisation in the Viskotester under a nitrogen atmosphere is followed by repeated measurement of the viscosity. The results are summarised in table 3.

Table 3

| Polyalkylene glycol (molecular weight) | % by weight | Polymerisation time onset [sec] | 16000 cP [sec] | Relative solution viscosity | Extract [%] |
|---|---|---|---|---|---|
| — | | 130 | 210 | $9.5^{x/}$ | 3.95 |
| Polyethylene glycol (20,000) | 0.2 | 140 | 200 | $7.4^{x/}$ | 3.1 |
| Polyethylene glycol (20,000) | 0.5 | 130 | 195 | $6.1^{x/}$ | 3.0 |
| Polyethylene glycol (20,000) | 1 | 130 | 200 | $5.8^{x/}$ | 2.9 |
| Polyethylene glycol (20,000) | 5 | 140 | 210 | $7.5^{x/}$ | 3.2 |
| Polyethylene glycol (20,000) | 10 | 130 | 220 | $7.6^{x/}$ | 6.3 |
| Polyethylene glycol (31,000) | 1 | 130 | 220 | $7.7^{x/}$ | 4.0 |
| Polyethylene glycol (31,000) | 3 | 120 | 230 | $10.4^{x/}$ | 4.7 |
| Polyethylene glycol (31,000) | 5 | 130 | 220 | $5.1^{x/}$ | 4.1 |
| Polyethylene glycol (31,000) | 10 | 130 | 230 | $17.7^{x/}$ | 6.1 |
| Comparison tests | | | | | |
| Polyethylene glycol 1550 | 0.2 | 130 | 200 | 30.2 | 3.7 |
| Polyethylene glycol 1550 | 1 | 200 | 290 | $9.9^{x/}$ | 4.7 |
| Polyethylene glycol 1550 | 3 | 270 | 435 | 17.2 | 6.8 |
| Polyethylene glycol 1550 | 5 | 400 | 700 | 5.4 | 12.4 |
| Polypropylene glycol 2025 | 0.5 | 130 | 200 | $16.5^{x/}$ | 3.2 |
| Polypropylene glycol 2025 | 5 | 220 | 340 | $19.9^{x/}$ | 7.8 |
| Polypropylene glycol 2025 | 10 | 270 | 400 | 19.9 | 9.8 |

$^{x/}$relative solution viscosity determined at 120°C.

The results summarised in table 3 indicate clearly that low-molecular weight polyalkylene glcyols cause a considerable increase in the reaction time at comparatively low concentrations while high-molecular weight products have no influence on the polymerisation velocity.

We claim:
1. A process for the production of polyamides with improved impact strength by activated anionic polymerization of a mixture comprising at least one lactam having at least 5 ring members, 0.1 to 1 mol %, based on the quantity of lactams of an activator selected from the group consisting of mono and polyisocyanates, and corresponding masked isocyanates, and an alkaline catalyst wherein said mixture is polymerized after the addition of 0.4–3% by weight of a high molecular weight polyalkylene glycol having unmodified end groups and a molecular weight of between 20,000 and 35,000 and an OH number below 6.

\* \* \* \* \*